(12) United States Patent
Mesic et al.

(10) Patent No.: US 9,297,112 B2
(45) Date of Patent: *Mar. 29, 2016

(54) PROCESS FOR MANUFACTURING A COMPOSITION COMPRISING CELLULOSE PULP FIBERS AND THERMOPLASTIC FIBERS

(71) Applicant: Södra Cell AB, Växjö (SE)

(72) Inventors: Narcis Mesic, Varberg (SE); Anna Linda Viktoria Friman, Kållered (SE)

(73) Assignee: SÖDRA CELL AB, Växjö (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/399,292

(22) PCT Filed: May 10, 2013

(86) PCT No.: PCT/SE2013/050527
§ 371 (c)(1),
(2) Date: Nov. 6, 2014

(87) PCT Pub. No.: WO2013/169203
PCT Pub. Date: Nov. 14, 2013

(65) Prior Publication Data
US 2015/0111997 A1     Apr. 23, 2015

(30) Foreign Application Priority Data

May 11, 2012  (SE) ...................................... 1250481
May 11, 2012  (SE) ...................................... 1250482

(51) Int. Cl.
| | | |
|---|---|---|
| C08L 1/00 | (2006.01) | |
| C08L 97/02 | (2006.01) | |
| D21H 11/04 | (2006.01) | |
| C08L 1/02 | (2006.01) | |
| D21H 25/04 | (2006.01) | |
| D21H 27/10 | (2006.01) | |
| D21H 13/24 | (2006.01) | |
| D21H 23/04 | (2006.01) | |
| D21H 13/12 | (2006.01) | |
| D21H 13/14 | (2006.01) | |
| D21H 13/20 | (2006.01) | |
| D21H 21/40 | (2006.01) | |
| B42D 25/29 | (2014.01) | |
| C08J 3/00 | (2006.01) | |
| B29C 70/12 | (2006.01) | |
| C08L 1/08 | (2006.01) | |
| C08L 67/04 | (2006.01) | |
| D21D 1/20 | (2006.01) | |
| B29K 67/00 | (2006.01) | |
| B29K 401/00 | (2006.01) | |

(52) U.S. Cl.
CPC ................ *D21H 11/04* (2013.01); *B29C 70/12* (2013.01); *B42D 25/29* (2014.10); *C08J 3/005* (2013.01); *C08L 1/02* (2013.01); *C08L 1/08* (2013.01); *C08L 67/04* (2013.01); *D21D 1/20* (2013.01); *D21H 13/12* (2013.01); *D21H 13/14* (2013.01); *D21H 13/20* (2013.01); *D21H 13/24* (2013.01); *D21H 21/40* (2013.01); *D21H 23/04* (2013.01); *D21H 25/04* (2013.01); *D21H 27/10* (2013.01); *B29K 2067/046* (2013.01); *B29K 2401/00* (2013.01); *B29K 2995/006* (2013.01); *C08J 2301/00* (2013.01); *C08J 2367/04* (2013.01); *C08L 2205/16* (2013.01); *Y10T 428/1397* (2015.01)

(58) Field of Classification Search
CPC ..... C08J 3/005; C08J 2301/00; C08J 2367/04
USPC .......................................................... 524/35
See application file for complete search history.

(56) References Cited

U.S. PATENT DOCUMENTS

| | | | | |
|---|---|---|---|---|
| 8,870,109 | B2 * | 10/2014 | Ghibellini .............. | D21D 1/306 241/261.3 |
| 2010/0193116 | A1 * | 8/2010 | Gamstedt ............... | D21H 13/12 156/246 |

FOREIGN PATENT DOCUMENTS

| | | |
|---|---|---|
| EP | 1405949 | 4/2004 |
| JP | 06346399 A | * 12/1994 |
| JP | H06346399 | 12/1994 |
| JP | 3358000 | 12/2002 |
| JP | 2003342891 | 12/2003 |
| JP | 4035376 | 1/2008 |
| KR | 20090099298 | 9/2009 |
| KR | 101005108 | 12/2010 |
| WO | WO 92/05311 | 4/1992 |

(Continued)

OTHER PUBLICATIONS

Translation of JP06-346399, Dec. 20, 1994.*
Spinu et al., Cellulose, 18(2), 247-256, 2011.*
Gong et al. Jan. 2012. "Novel blend of biorenewable wet-end paper agents." Tappi Journal, vol. 11, No. 1. pp. 41-48.
Hasan et al. 2010. "Strength properties of kraft pulp produced from hot-water extracted woodchips within the biorefinery." Journal of Biobased Materials and Bioenergy, vol. 4. pp. 46-52.
Larsson et al. 2012. "Polylactide latex/nanofibrillated cellulose bionanocomposites of high nanofibrillated cellulose content and nanopaper network structure prepared by a papermaking route."0 Journal of Applied Polymer Science, vol. 125. pp. 2460-2466.
Wang et al. 2007. "The effect of chemically coated nanofiber reinforcement on biopolymer based nanocomposites." In: BioResources. vol. 2, No. 3. pp. 371-388.

(Continued)

*Primary Examiner* — Hui Chin
(74) *Attorney, Agent, or Firm* — Ballard Spahr LLP

(57) ABSTRACT

The invention relates to a process for manufacturing a composition comprising cellulose pulp fibers and thermoplastic fibers wherein said process comprises the step of: a) mixing a refined aqueous pulp suspension with a water suspension of thermoplastic fibers. The invention also relates to compositions and composite articles obtainable by said process.

14 Claims, 2 Drawing Sheets

(56) References Cited

FOREIGN PATENT DOCUMENTS

| WO | WO 2009/008822 | 1/2009 |
|----|----------------|--------|
| WO | WO 2013/169204 | 11/2013 |

OTHER PUBLICATIONS

International Preliminary Report on Patentability mailed on Jul. 17, 2014 for International Application No. PCT/SE2013/050528, which was filed on May 10, 2013 and published as WO 2013/169204 on Nov. 14, 2013. (Inventor—Narcis Mesic; Applicant—Södra Cell AB) (pp. 1-16).

International Search Report mailed on Sep. 2, 2013 for International Application No. PCT/SE2013/050528, which was filed on May 10, 2013 and published as WO 2013/169204 on Nov. 14, 2013. (Inventor—Narcis Mesic; Applicant—Södra Cell AB). (pp. 1-5).

International-Type Search Report mailed on Nov. 27, 2012 for International Application No. PCT/SE2013/050528, which was filed on May 10, 2013 and published as WO 2013/169204 on Nov. 14, 2013. (Inventor—Narcis Mesic; Applicant—Södra Cell AB). (pp. 1-5).

International Preliminary Report on Patentability mailed on Jun. 30, 2014 for International Application No. PCT/SE2013/050527, which was filed on May 10, 2013 and published as WO 2013/169203 on Nov. 14, 2013. (Inventor—Narcis Mesic; Applicant—Södra Cell AB). (pp. 1-13).

International Search Report mailed on Sep. 2, 2013 for International Application No. PCT/SE2013/050527, which was filed on May 10, 2013 and published as WO 2013/169203 on Nov. 14, 2013. (Inventor—Narcis Mesic; Applicant—Södra Cell AB). (pp. 1-5).

International-Type Search Report mailed on Nov. 27, 2012 for International Application No. PCT/SE2013/050527, which was filed on May 10, 2013 and published as WO 2013/169203 on Nov. 14, 2013. (Inventor—Narcis Mesic; Applicant—Södra Cell AB). (pp. 1-5).

\* cited by examiner

| PLA % | Refining | Density kg/m3 | Tensile index Nm/g | Tear index mNm2/g | Stretch % | Air permeability µm/Pa s | Z-strength kPa | Formation | Wet strength Nm/g | TEA kJ/kg | TSI MNm/kg | Fold log 10 |
|---|---|---|---|---|---|---|---|---|---|---|---|---|
| 10 | Pulp mill | 605 | 57 | 15 | 5,2 | 31 | 775 | 6,9 | 10 | 2100 | 5,2 | 2,3 |
| 10 | Paper mill | 660 | 71 | 14 | 4,3 | 10 | 735 | 7,3 | 2 | 2150 | 6,3 | 3 |
| 30 | Pulp mill | 620 | 59 | 10 | 3,7 | 75 | 770 | 8 | 21 | 1500 | 5,5 | 1,7 |
| 30 | Paper mill | 640 | 64 | 9 | 2,8 | 15 | 730 | 9,5 | 12 | 1340 | 6,3 | 2,7 |
| 50 | Pulp mill | 705 | 51 | 5,4 | 2,7 | 190 | 680 | 9 | 33 | 900 | 4,6 | 1 |
| 50 | Paper mill | 685 | 48 | 5,4 | 1,6 | 24 | 630 | 11,5 | 21 | 500 | 5,2 | 2 |

Fig.5

| Sample | PLA fiber | Air permeability (µm/Pas) | Density (kg/m³) |
|---|---|---|---|
| 1 | Crimped | 237 | 385 |
| 2 | Non-crimped | 212 | 394 |

PROCESS FOR MANUFACTURING A COMPOSITION COMPRISING CELLULOSE PULP FIBERS AND THERMOPLASTIC FIBERS

CROSS-REFERENCE TO RELATED APPLICATIONS

This application is a National Phase Application of International Application No. PCT/SE2013/050527, filed on May 10, 2013, which claims priority to Swedish Patent Application No. 1250482-5, filed May 11, 2012; and Swedish Patent Application No. 1250481-7, filed May 11, 2012, each of which are hereby incorporated by reference in their entirety.

TECHNICAL FIELD

The present invention relates to a process for manufacturing a composition comprising cellulose pulp fibers and thermoplastic fibers. Further, the invention relates to compositions and/or articles comprising cellulose pulp fibers and thermoplastic fibers produced in said process. The thermoplastic fibers may be polylactic fibers.

BACKGROUND

Polymers from renewable resources have attracted an increasing amount of attention over the last two decades mainly due to two reasons: environmental concerns and the limitations of the petroleum resources. Like most polymers from petroleum feed stock, polymers from renewable resources are rarely used as functional materials in a pure state. Instead, composites comprising the polymers from renewable resources are often used to improve specific properties.

Cellulose fibers are widely used in polymeric materials to improve the mechanical properties of composite materials. Cellulose is the major substance obtained from vegetable fibers, and applications for cellulose fiber-reinforced polymers are at the forefront with a focus on renewable raw materials.

The development of synthetic polymers using monomers from natural resources provides a new direction to develop environmentally friendly biodegradable polymers from renewable sources. One of the most promising polymers in this regard is polylactic acid (PLA), because it can be made from agricultural products and is readily biodegradable.

The usual objective for preparing novel blends of two or more polymers is not to change the properties of the polymers drastically, but to capitalize on the maximum possible performance of the blend.

The use of PLA matrix reinforced with various cellulose fibers has been widely reported. The cellulose fibers have successfully improved modulus and tensile strength of the PLA matrix. However, the poor interface between hydrophobic PLA and hydrophilic cellulose fibers results in poor mechanical properties. In order to improve the interface between the PLA fibers and the cellulose-based fibers, various surface treatments have been developed, such as esterification, alkali treatment, and cyanoethylation. However, it is still a problem to produce a homogenous mixture of cellulose fibers and PLA fibers. This is especially true when manufacturing paper with high amount of bio-fiber as long bio-fibers tend to create bundles and fiber flocks. Furthermore, the strength of the cellulose will usually be reduced when mixing a biopolymer, such as PLA, with cellulose fibers. The lack of homogeneity deteriorates the structure of the obtained product and produces products with uneven properties. Therefore, it is highly important to obtain a mixture of cellulose and bio-fibers that is as homogeneous as possible. Homogeneity may be improved by using a suspension of short cellulose fibers. However, the drawback of using a suspension of short cellulose fibers is that the mechanical properties such as tear strength of the resulting material are deteriorated.

One way to increase the homogeneity of a composition as disclosed above is to add e.g. lubricants and/or surfactants to the fiber suspension. The lubricant and/or surfactants will reduce the friction between fibers and thereby reduce formation of large fiber flocks. However, the addition of lubricants and/or surfactants tends to create problems with foaming. Further methods relate to changing the surface of the cellulose fibers. However, these solutions do not fully solve the problem of providing suitable compositions comprising thermoplastic fibers such as PLA fibers and cellulose fibers having good formation, controlled air permeability, good fold and tear index when converted into different products.

WO 2009008822 discloses processes for manufacturing a composite material having reduced mechanosorptive creep. However, the process disclosed does not overcome the problem with providing homogeneity.

It is an object of the present invention to provide an improved process for producing compositions comprising cellulose pulp fibers and thermoplastic fibers. Furthermore, it is also an object of the present invention to provide compositions and composite articles comprising cellulose pulp fibers and thermoplastic fibers which overcome the above-mentioned problems. The thermoplastic fibers may be PLA fibers.

SUMMARY OF THE INVENTION

The present invention relates to a process for manufacturing a composition comprising cellulose pulp fibers and thermoplastic fibers wherein said process comprises the step of:
a) mixing refined wet pulp with a water suspension of thermoplastic fibers.

It has surprisingly been found that the above-mentioned problems are avoided by refining the cellulose pulp fibers and subsequently mixing the refined cellulose pulp fibers in a wet state with an aqueous suspension of thermoplastic fibers. Thus, the refined cellulose pulp fibers as well as the thermoplastic fibers are in a wet state when being mixed together. The thermoplastic fibers are not refined, i.e. they are non-refined thermoplastic fibers. The cellulose pulp fibers are refined to the desired extent prior to being mixed with the thermoplastic fibers. In this way, the desired shape and/or properties of the cellulose pulp fibers such as fiber length, disentanglement, mechanical strength, tensile index, and strain may be obtained without affecting the thermoplastic fibers. This is a significant benefit since thermoplastic fibers may be affected in an undesired way by refining. For instance, refining of thermoplastic fibers may lead to fiber shortening, fiber surface modification, melting, formation of lumps and/or clogging. In particular, coated thermoplastic fibers may lose all or part of their coating during refining thereby changing the fiber properties and behavior in the dispersion resulting from mixing the refined cellulose pulp fibers in a wet state with the aqueous suspension of thermoplastic fibers.

A further advantage of the process described herein is that it allows for use of crimped as well as straight, i.e. non-crimped, thermoplastic fibers such as PLA fibers. Since crimped thermoplastic fibers are handled as bales they are preferred to use on an industrial scale compared to straight thermoplastic fibers that are supplied in bags. When making, for instance, a paper sheet non-crimped fibers would be expected to be spread out in a different manner compared to crimped fibers thereby affecting the mechanical properties of the produced paper sheet. Unexpectedly, the inventors of the present invention have found that the mechanical properties of the compositions and composite articles resulting from the process described herein exhibit essentially the same mechanical properties when using crimped and non-crimped thermoplastic fibers, respectively.

Refining of the pulp comprising the cellulose fibers may be performed using conventional refiners such as, but not limited thereto, cone refiners, disc refiners and cylindrical refiners. The refining may be performed using an energy input from 60 to 300 kWh/ton, such as from 80 to 110 kWh/ton, such as 100 kWh/ton. The refining may be performed in a temperature range from 60 to 90° C. Further, the refining may be performed at a specific edge load, i.e. the amount of energy (Joule) applied across one meter of the plate of the refiner, of from 1 to 5 J/m.

The cellulose pulp fibers may be obtained from bleached or unbleached pulp. The pulp may be wood pulp or pulp from plants such as cotton, hemp and bamboo. Thus, the cellulose pulp fibers may be cellulose wood pulp fibers. Said pulp may be obtained directly from a pulp mill, or it may be never-dried pulp from a pulping line, as well as dried pulp. The never-dried pulp may be never-dried softwood pulp. The never-dried pulp may also be never-dried softwood kraft pulp. Use of never-dried pulp offers advantages such as reduced energy requirement and reduced cost. The pulp may be manufactured from pulp processes known to the skilled person.

The cellulose fibers in the composition as defined herein may have a length of from 0.5 to 4 mm, such as from 1 to 3 mm, such as from 2 to 3 mm. Further, the cellulose pulp fibers may be chemically modified by using a chemical compound, such as but not limited to, for example, CMC (carboxymethyl cellulose). The CMC may additionally reduce the friction and improve dispersion of the fibers.

The refined cellulose pulp fibers to be mixed with the thermoplastic fibers are in a wet state, i.e. they are mixed with water. As used herein, cellulose pulp fibers in a wet state are denominated wet pulp. The wet pulp may be a pulp suspension or a pulp slurry.

The cellulose pulp fibers may be comprised in a pulp suspension, i.e. an aqueous suspension comprising from 2 to 30 weight % of cellulose pulp fibers. The pulp suspension may be obtained by adding water or white water to the cellulose pulp fibers. The pulp suspension may have a concentration of 4 weight % or less, such as from 0.1 to 4 weight %, such as from 1 to 4 weight %, such as from 3 to 4 weight %, such as below 3.5 weight %, such as from 2 to 4 weight %.

Prior to mixing the thermoplastic fibers with the refined wet pulp, the thermoplastic fibers are suspended in water. The water may have a temperature of 70° C. or lower, such as 60° C., such as 50° C. The obtained suspension may have a concentration from 2 to 5 weight %, such as 3.5 weight % based on the thermoplastic fibers. The handling of the thermoplastic fibers is greatly facilitated by suspending the thermoplastic fibers in water and using the resulting aqueous suspension of thermoplastic fibers for mixing with the wet pulp. In addition, mixing the aqueous suspension of thermoplastic fibers with the wet pulp affords a homogeneous suspension. This is in contrast to using dry thermoplastic fibers which leads to an inhomogeneous mixture in which there are bundles of fibers.

Thus, there is provided a process for manufacturing a composition comprising cellulose pulp fibers and thermoplastic fibers wherein said process comprises the step of:

a) mixing a refined aqueous pulp suspension with an aqueous suspension of thermoplastic fibers. The aqueous pulp suspension may have a concentration equal to or less than 4 weight %, such as from 0.1 to 4 weight %, such as from 1 to 4 weight %, such as from 3 to 4 weight %, such as below 3.5 weight %, such as from 2 to 4 weight %.

Alternatively, the cellulose pulp fibers may be comprised in a pulp slurry, i.e. a pulp comprising 35-50 weight % cellulose pulp fibers in water. Accordingly, there is provided a process for manufacturing a composition comprising cellulose pulp fibers and thermoplastic fibers wherein said process comprises the step of:

a) mixing a refined aqueous pulp slurry with an aqueous suspension of thermoplastic fibers.

It will be appreciated that the process as described herein may comprise a step of refining the cellulose pulp fibers prior to step a). Thus, there is provided a process for manufacturing a composition comprising cellulose pulp fibers and thermoplastic fibers wherein said process comprises the steps of:

a') refining a pulp, and
a) mixing refined pulp with a water suspension of thermoplastic fibers.

In the process described herein the aqueous suspension of thermoplastic fibers may have a concentration of 2 to 5 weight % such as from 3 to 4 weight % or approximately 3.5 weight %.

Furthermore, the thermoplastic fibers such as PLA fibers may be coated with a coating.

The coating may comprise a non-ionic polymer and/or an anionic polymer and/or a cationic polymer and/or a lubricant. The homogeneity of the composite material and composite article obtained by the process described herein may be enhanced by coating the thermoplastic fibers with the coating. The coating may enable separation of the cellulose fibers and the thermoplastic fibers and thereby reduce the agglomeration of the fibers. The coating may also be referred to as finish composition or finish.

The coating may comprise from 40 to 60 weight % of lubricant, from 15 to 35 weight % of anionic polymer and from 10 to 25 weight % of non-ionic polymer. The coating may also comprise from 1 to 5 weight % of a biocide, an antioxidant, an anti-friction agent and/or a viscosity regulation agent. The lubricant may be selected from waxes, such as synthetic waxes, esters, such as butyl stearate, ethoxylated esters, ethoxylated fatty acids, ethoxylated fatty acids and polyethers, The anionic polymer may be selected from a anionic tenside, such as an anti-static agent, such as alkyl acid phosphates and their salts, ethoxylated derivatives of the before mentioned substances, phosphate ethoxylated of fatty acids and alcohols, organic sulfates and sulfonates. The non-ionic polymer may be selected for non-ionic tensides, such as emulsifiers such as polyglycols, polyglycol esters and ethers, glyceryl fatty acid esters, ethoxylated alcohols, fatty acids, fatty amides, alkyl phenols or derivatives thereof. The selection of each component comprised in the coating depends on the use of the composition as defined herein, for example if the composition is to be used for a food application in the US then components approved by the Food and Drug Administration (FDA) should be selected.

The amount of coating in relation to the amount of the thermoplastic fibers may range from 0.19 to 0.5 weight %, such as from 0.25 to 0.45 weight %, such as from 0.30 to 0.40 weight %. Further, the coating may not have to coat the whole thermoplastic fiber, i.e. the thermoplastic fibers may be partially coated. Furthermore, the fibers may not have to be coated with the same coating and therefore the total amount of thermoplastic fibers may comprise thermoplastic fibers having different composition of the coatings. Also, not all of the thermoplastic fibers may be coated with the coating as defined hereinabove or hereinafter, for example, but not limited to, 80% or more of the thermoplastic fibers may be coated, such as from 80 to 99% of the thermoplastic fibers may be coated. The thermoplastic fibers may be coated with one, two or more layers of coating. As mentioned previously, the thermoplastic fibers may be PLA fibers.

There are different processes available for applying a coating to the thermoplastic fibers such as PLA fibers. One of the most common processes used comprises drawing the fiber over a roller, which in turn rotates in a bath comprising the coating. The amount of applied coating is determined by the speed of the roller, the viscosity of the coating and of the wetting potential of the coating. Additives may be added to the melt of the thermoplastic such as a PLA melt when manufacturing the thermoplastic fibers such as PLA fibers. An example of such an additive is ethylene bissteramide (EBS) that may be added in an amount of from 0.1 to 0.5%. EBS contributes to making the fibers soft and flexible and also reduces metal adhesion.

The thermoplastic fibers may be selected from fibers of polyolefins, polyesters, polycarbonates, polyvinyls, copolymers thereof; and mixtures of thereof. The polyolefin may be selected from polyethylene and polypropylene. The polyester may be selected from polyhydroxybutyrat (PHB) and PLA.

The thermoplastic fibers may be selected from fibers made of polyethylene (including LDPE, LLDPE, MDPE, HDPE), polypropylene, polyhydroxybutyrat (PHB) and PLA and copolymers thereof.

Preferably, the thermoplastic fibers are PLA fibers. The PLA fibers may be coated with a coating as described herein.

The thermoplastic fibers such as PLA fibers of the composition or composite article as described herein may have a length of from 1 to 6 mm. Further, the thermoplastic fibers such as PLA fibers may have a dtex of from 0.5 to 2.0, such as from 0.9 to 1.7, such as 1.5 to 1.7. The thermoplastic fibers such as PLA fibers may have a crimp angle of 98° or more, such as up to 180°. According to the present invention, the thermoplastic fibers such as PLA fibers may have a crimp number of from 1 to 7 crimp/cm, such as from 1 to 4 crimp/cm. Contrary to expectation, in the process described herein crimped thermoplastic fibers were found to provide compositions and composite articles having substantially the same properties with respect to, for instance, air permeability and density as when non-crimped thermoplastic fibers were used. The degree of crystallinity of the thermoplastic fibers such as PLA fibers may vary. For example, the PLA fibers may have a crystallinity of 40%. The degree of crystallinity will depend on the intended use of the composition as defined herein.

The process as described herein may further comprise the steps of:
b) dewatering the composition into a composite article, and
c) drying the composite article.

The dewatering may be performed using a press such as, but not limited thereto, a roll press or a shoe press. Also, the dewatering may be performed using several consecutive presses, such as two or more presses. The composite article having undergone dewatering may have a water content from 30-70 weight %, such as from 40 to 65 weight %

The drying may be performed using a flash drier or sheet drier. The composite article having undergone drying may have a water content from 1 to 30 weight % such as from 5 to 20 weight %.

The process described herein will provide compositions and composite articles comprising cellulose pulp fibers and thermoplastic fibers. The compositions may be transformed into composite articles such as flakes or bales. The bales may have a weight from 50 to 300 kg, from 100 to 300 kg or 100-200 kg. When manufacturing a bale, the composition may be compacted by using a press, for example. The composite articles are suitable for storage, transportation and further transformation into various products such as paper sheets, containers, food containers, specialty paper, tissue paper, tea bags, labels, furniture, security paper, banknote paper, fiber board, paper board, fabric, laminates, and billboards. It has been found that a paper sheet formed from the composite article produced in accordance with the process described herein has excellent properties with regard to tear index, tensile stiffness, controlled air permeability and formation. The paper sheet comprises cellulose fibers and a thermoplastic dried at a temperature above the melting point of the thermoplastic. The thermoplastic may be PLA. The measurement of formation is described below.

The composition and/or composite article as defined herein may comprise 70 weight % or less of thermoplastic fibers, such as from 5 to 50 weight % of thermoplastic fibers, such as from 10 to 40 weight %, such as from 10 to 30 weight %. The thermoplastic fibers may be PLA fibers.

The composite articles obtained by the process described herein may be used as starting material for making a desired product. Alternatively, the composite articles may be subjected to additional treatment before transformation into a desired product. For instance, the composite articles as described herein may be disintegrated, shredded, suspended in water and/or refined before being converted into products such as tea bags, labels and specialty paper. Also, the skilled person is aware that other components may be added before the composition or composite article is converted into the different products. Examples of such components include organic or inorganic pigments, binders, retention agents, flocking agents, adhesives and/or fixing agents.

Thus, there is provided a process as described herein further comprising the step of:
d) refining the composite article.

The process described herein may also comprise the step of:
e) adding an aqueous suspension of thermoplastic fibers.

The process described herein may also comprise the steps of:
f) dewatering the composition of step e) into a composite article, and
g) drying the composite article above the melting point of the thermoplastic fibers.

Measurement of Formation

Formation is the distribution of fiber within the plane of the sheet, i.e. the small scale variation of the mass distribution within the plane of a sheet of paper. Formation number, herein also called formation, is the generally accepted quantitative index of formation and is the coefficient of variation of local grammage, i.e. the ratio of the standard deviation to the sheet average grammage. The formation was measured accordingly:

A radiogram image was generated by exposing a sample sheet to a beta source (C-14) and recording the radiation transmitted through the sheet with an image plate. A scanned digital gray scale image was transferred to the actual grammage map by using calibration strip with known grammage levels along one side of the sample. Formation analysis was performed from grammage map. Analysis presented the formation numbers.

The equipment used:
Radiation source: C-14, size at least 120 mm×120 mm, typically activity 750 MBq Calibration frame: 3-8 stripes, which basis weight are known
Scanner: Fujifilm IP reader with IP eraser or similar.
Imaging plates (IP): Fujifilm BAS-IP MS-type or similar
Software: MatLab evaluation tools The procedure was performed accordingly:

Basis weight of the sample was measured and the samples are stored over-night for conditioning. The samples were weighed and the grammage was calculated in g/m².

The image plate had to be erased before use. Erasure time was at least 20 min. The measurement plate was also erased at least 1 min.

To obtain the same exposure of the image plate, independent of the basis weight of the sample, the exposure time had to change by following equation:

$$\text{Exposure time} = Ae^{\mu B} \quad (1)$$

wherein A is a constant, depending the intensity of the radioactive source, $\mu$ is the absorption coefficient: typical 0.031 and B is the average basis weight of the sample.

The unit for the exposure of each pixel in the scanner had the unit PSL, which is an internal unit for the Fuji equipment. The PSL level was coupled to the mean grey level of the image of the paper on the exposed plate. The PSL level was shown by the evaluation programs.

Constant A from equation (1) is fixed to PSL level 30. To find out the coefficient A which had to be calibrated for each exposure system according to the following procedure:

Set A to 5: in the formula: (1).

Take a paper sample and measure the basis weight and calculate the exposure time.

Make the exposure on the paper sample with the calculated time. If the PSL shown in the evaluation program becomes 35 then the A=5*30/35 for this exposure equipment.

There are two levels PSL levels in the standard:
High level: PSL=30
Low level: PSL=10
PSL=30 is recommended when high accuracy is important
PSL=10 could be used when the time used for the analysis is important. PSL=10 gives a slightly noisier result. The exposure time for PSL=10 is ⅓ of the time calculated for PSL=30

The sample was put between image plate and C-14 radiation source. After exposing the samples, image plate was read in Fuji scanner within ½ hour ending of the exposure. Spatial resolution was set to 100 μm. When the exposure time had elapsed, the exposure was stopped automatically by the exposure unit. However, the image plate was scanned within half an hour after the exposure had ended. The image plate was placed in the scanner, which scanned the exposed image to the computer.

By exposing the image plate without sample to PSL level 30, background profile (3D shape) was obtained. Smoothing the background profile and using it to correct all the images, provided more accurate results.

Basis weight calibration to grey scale image was performed by using known grammage strips along the one side of the sample (example mylar film).

The formation parameters were calculated from basis weight image.

DEFINITIONS

The term thermoplastic fibers refers to polymer based fibers where the polymer may have a renewable or non-renewable origin. The fibers are characterized by obtaining a melting point upon heating. Examples of thermoplastic fibers include polyolefins, polyesters, polycarbonates, polyvinyls and copolymers and mixtures thereof.

As used herein, the term "polylactic acid", also known as polylactide or PLA, which is a thermoplastic aliphatic polyester, is intended to also include poly-L-lactide (PLLA), poly-D-lactide (PDLA) and poly(L-lactide-co-D,L-lactide) (PLDLLA).

The terms "cellulosic fiber" and "cellulose fiber" are intended to include fibers from any plant and plant-based material. Example of such fibers but not limited thereto are fibers from wood, cotton, hemp and bamboo. Examples of wood fibers, but not limited thereto, are fibers from pine, spruce, birch and eucalyptus. Examples of manufacturing methods include chemical pulping, CTMP, TMP, soda cooking and organosolv.

The expression "cellulose pulp fiber" is intended to mean cellulose fibers from a pulp. The pulp may be obtained from any plant and plant-based material such as softwood, hardwood, cotton, hemp and bamboo.

The term "formation" as used herein is intended to mean the distribution of fiber within the plane of a sheet and may refer to the transmission of visible light (optical formation) or β-radiation (paper formation).

The term "crimp" is intended to mean the waviness of a fiber, i.e. the condition in which the axis of a fiber under minimum external stress departs from a straight line and follows a simple or a complex or an irregular wavy path.

The term "crimp angle" is intended to mean the angle $\alpha$ between the leg of a crimp wave and the zero line may be used to characterize crimp geometry. The crimp angle is the angle between the two legs of a crimp bow and indicates the sharpness of a crimp.

The term "crimp number", which is also called crimp frequency or crimp count characterizes the number of crimp bows or waves per length of straightened fiber.

The term "wet pulp" is intended to mean cellulose pulp fibers mixed with water.

A pulp slurry is intended to mean a pulp comprising 35-50 weight % cellulose pulp fibers in water.

The term pulp suspension is intended to mean an aqueous suspension comprising from 2 to 30 weight % of cellulose pulp fibers.

BRIEF DESCRIPTION OF THE DRAWINGS

The processes disclosed herein will be described in more detail with reference to the appended drawings wherein:

FIG. 5 shows the properties of paper sheets produced by different refining procedures and different PLA concentrations.

FIG. 6 shows the properties if paper sheets comprising crimped and non-crimped PLA fibers, respectively.

It should be noted that the drawings have not been drawn to scale and that the dimensions of certain features have been exaggerated for the sake of clarity.

DETAILED DESCRIPTION

Figure 1:
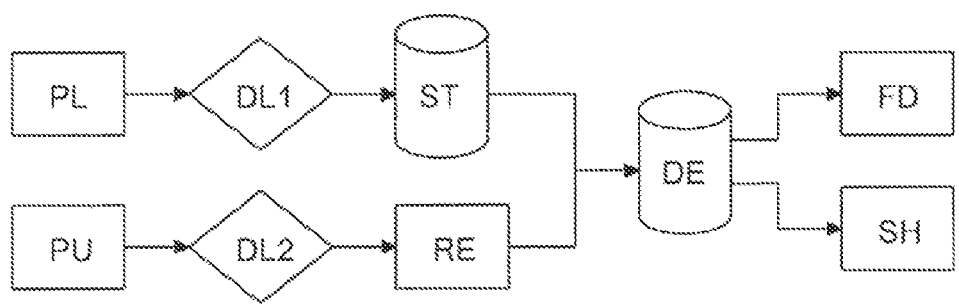
FIG. 1 shows a process diagram of a process as defined herein.

FIG. 1 shows a process diagram of a process as defined herein.

"PL" is a vessel containment for thermoplastic fibers such as PLA fibers.

"PU" is a vessel for a cellulose pulp suspension or a pulp slurry.

"DL1" is the preparation of the thermoplastic fiber slurry step.

"DL2" is the preparation of the pulp slurry/dilution step.

"ST" is the storage tower of the thermoplastic fiber slurry.

"RE" is the refining step.

"DE" is the dewatering step.

"FD" is a flash drier.

"SH" is a sheet drier.

The PLA and cellulose are mixed before the dewatering step.

The refining step may be performed on a pulp comprising cellulose fibers such as a pulp suspension or a pulp slurry. Refining of the cellulose fibers may increase the swelling of the cellulose fibers and thereby reduce the friction between the fibers and increase the homogeneity of the composition as defined herein. This is also true for paper sheets manufactured from said composition. The refining may provide a positive effect on the mechanical properties, such as tensile index, Z-strength and maximum strain of the refined cellulose pulp fibers. At the refining step, the pulp may be pumped into a refiner and further into the area between the rotor and the stator. The rotor has a pumping function and will bring the pulp into the area between the refining segments and transfer the pulp to the other side of a refining zone. Hollow grooves in the refining segment will transport the pulp while the refining is performed in a narrow area between the rotor and the stator. The bar angle may be selected from 20 to 40° such as 30°.

The drying may be performed using hot air having a temperature below the melting point of the thermoplastic fibers and may be performed in several steps.

Figure 2:
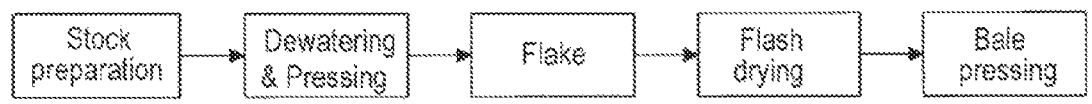

FIG. 2 discloses a process for manufacturing flash dried bales comprising the composition as defined herein. The composition (the stock) may be dewatered and pressed. The solids content may thereby be increased and the composition may be shredded and flakes may be produced. These flakes may then be transferred to a flash dryer by airflow wherein the pulp flakes may be dried, by e.g. using several steps. After drying, the flakes may enter the first press by using screws feeders, wherein bales may be formed. Thereafter, the bale may be taken to a second press and thereafter packaged.

Figure 3:
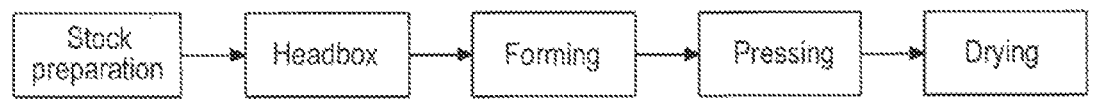
FIG. 3 shows a process diagram of a process for manufacturing a sheet.

FIG. 3 discloses a process for manufacturing a sheet comprising the composition as defined herein. During the preparation of said composition (the stock), the cellulose fibers and the thermoplastic fibers (such as the PLA fibers) are mixed, pH may be adjusted and the composition may be diluted by the white water, i.e. the filtrate from the wet end of the pulp process, to a concentration of 0.15 weight %. The obtained composition may then be pumped to the headbox and may be uniformly distributed at a forming wire.

The forming wire may be an endless cloth of polyurethane or similar material wherein the fiber suspension may be filtrated and the thermoplastic and cellulose fibers may be retained at the top of the wire during the dewatering, while solvent/white water passes through the permeable cloth web. Dewatering occurs by gravity and vacuum. The solids content of the wet web may be about 20% prior to being transferred to the press felt and enters the pressing section. Ultra sound equipment may be used to improve the formation and dewatering of the wet web.

The pressing section may comprise one or more presses, such as, but not limited to, roll and/or shoe presses. The main task of the press section may be to increase the solids content and thereby reduce the required drying energy. Dewatering may occur by mechanical impact on the wet web and the water may be pressed out to the press felt.

The drying section may comprise of a few hundred meters long drying path through a drier. Drying may be performed by hot air (150° C.), which may be heated by hot steam. The drier may comprise several levels, wherein the wet web may be transferred above the plates and the hot air may be blown through narrow nozzles. After the drying step, the temperature of the obtained web may be reduced and the web may be cut into individual sheets, which may be piled up to stacks until a final height of the stack has been achieved. In a subsequent step, the stacks are pressed and bales may be produced. The composite articles such as the bales may be transformed into sheets or into small rolls.

Figure 4:
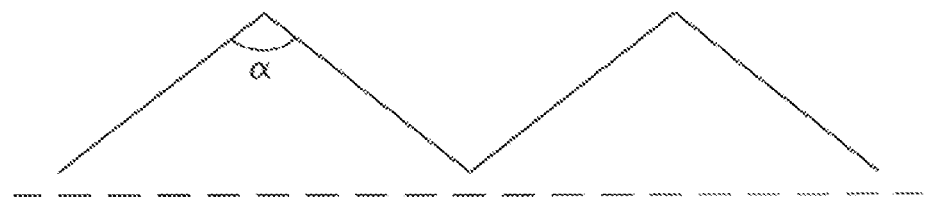
FIG. 4 shows the crimp angle $\alpha$ of a fiber.

FIG. 4 shows the waviness of a fiber. The fiber is depicted as continuous line. The fiber has a crimp angle $\alpha$.

FIG. 5 shows the properties of paper sheets manufactured by different refining procedures and three different PLA concentrations. The physical testing was performed as described in Example 2 below. The formation was measured as described in this document.

The three different PLA concentrations refer to aqueous suspensions of PLA having a concentration of 10 weight %, 20 weight % and 30 weight %. The procedure denominated "Pulp mill" refers to the trial where the refining was performed only on cellulosic pulp during the production of the pulp/PLA mixture, while "Paper mill" refers to the trial where the refining was performed on the pulp/PLA mixture.

Pulp Mill:

The procedure denominated "Pulp mill" refers to refining of never-dried softwood kraft pulp at a concentration of 4 weight % after which it is mixed with an aqueous solution of PLA fibers.

Dry 4 mm PLA fibres were used and diluted in the water where 4% suspension of PLA fibres was produced. Similarly the 4% pulp suspension was produced of a never dried cellulose pulp. The refining was performed only with cellulose pulp at the laboratory refiner LR 40. Energy input for refining was 100 kWh/t.

The suspensions were mixed in a blender and dewatered by centrifugation. The whole wet mixture was first transformed to form approximately 1 cm wide flings which were stored in a large drying basket so that the layer of fling was 5 cm high. The basket with fling-pulp was then placed in a drying chamber and dried. Drying of fling pulp in the drying chamber was performed with hot air at 90° C. and 50% Rh. The hot air was circulated within the drying chamber and the temperature and the Rh were controlled automatically. The hot air was blown from underside of the drying chamber, passing through the basket and wet pulp/PLA flings. The drying was ongoing until the moisture content of the pulp/PLA mixture was reduced to 10%. After drying the pulp/PLA mixture was disintegrated in the water to consistency of 4% and the wet paper sheets were produced at Fininsh sheet former according standard procedure described in SCAN-CM 26:99. The basis weight of produced paper sheets with dimension 16.5×16.5 cm were 100 g/m². The wet paper sheets were pressed between two blotters to a solids content about 40-50% depending on refining and swelling. Wet pressed paper sheets were dried restrained at 23° C. and 50% Rh 48 hours and after that prepared for hot pressing. Prior the hot pressing the paper sheets were dried 15 minutes in a oven at 105° C. After this drying the sheets were pressed in 7 minutes in a plane press at a temperature of 180° C. and pressure of 200 N/cm². The "activated" paper sheets with melted PLA were cooled down and left in a testlab at 23° C. and 50% Rh until they were analysed.

Paper Mill:

Dry 4 mm PLA fibres was used and diluted in water where 4% suspension of PLA fibres were produced. Similarly the 4% pulp suspension was produced of a never-dried cellulose pulp.

The suspensions were mixed in a blender and dewatered by centrifugation. The whole wet mixture was first transformed to form approximately 1 cm wide flings which were stored in a large drying basket so that the layer of fling was 5 cm high. The basket with fling-pulp was then placed in a drying chamber and dried. Drying of fling pulp in the drying chamber was performed with hot air at 90° C. and 50% Rh. The hot air was circulated within the drying chamber and the temperature and the Rh were controlled automatically. The hot air was blow from underside of the drying chamber, passing through the basket and wet pulp/PLA flings. The drying was ongoing until the moisture content of the pulp/PLA mixture was reduced to 10%.

After drying the pulp/PLA mixture was disintegrated in water to consistency of 4% and the whole mixture was refined at the laboratory refiner LR 40. Energy input for refining was 100 kWh/t.

After refining the PLA/pulp suspension was diluted and the wet paper sheets were produced at Finnish sheet former according standard procedure described in SCAN-CM 26:99. The basis weight of produced paper sheets with dimension 16.5×16.5 cm were 100 g/m². The wet paper sheets were pressed between two blotters to a solids content about 40-50% depending on refining and swelling. Wet pressed paper sheets were dried restrained at 23° C. and 50% Rh 48 hours and after that prepared for hot pressing. Prior the hot pressing the paper sheets were dried 15 minutes in a oven at 105° C. After this drying the sheets were pressed in 7 minutes in a plane press at a temperature of 180° C. and pressure of 200 N/cm². The "activated" paper sheets with melted PLA were cooled down and left in a testlab at 23° C. and 50% Rh until they were analysed.

The process to be used will depend on the desired properties of the paper sheet. For instance, when high wet strength is desired the Pulp mill procedure may be used in combination with a PLA concentration of 10 weight %.

FIG. 6 shows the properties of a paper sheet manufactured in accordance with Example 2 described herein. Crimped and non-crimped fibers were used, respectively. Contrary to expectation, the paper sheet comprising non-crimped PLA fibers exhibited substantially the same properties as the paper sheet comprising non-crimped, i.e. straight, PLA fibers.

Further Aspects

There is provided a first further aspect directed to a process for manufacturing a composition comprising thermoplastic fibers and cellulose fibers, wherein said process comprises the steps of:
 a) refining a pulp;
 b) mixing the refined pulp from step a) with non-refined thermoplastic fibers.

In still a further aspect there is provided a paper sheet comprising the composition as defined herein and a process for manufacturing said paper sheet. The paper sheet has excellent properties in regard to formation, tear index, controlled air permeability and formation. The paper sheet comprises fibers and PLA fibers dried at temperature below the melting temperature of the PLA. The process comprises the steps of:
 i) refining pulp;
 ii) suspending PLA fibers in water;
 iii) mixing the refined pulp from step i) with a suspension comprising the non-refined PLA fibers obtained from step ii);
 iv) dewatering the obtained composition from step iii);
 v) drying the obtained composition from step iv); and
 vi) optionally refining the composition obtained from step v)

The pulp may be a wet pulp or a pulp slurry. Furthermore, said process for manufacturing a paper sheet may also comprise an additional step wherein the composition obtained from step v) is converted into a slurry by adding a solvent before step vi). After step vi) the composition is formed as a paper sheet, dewatered and dried, the dewatering and drying may be performed by using a paper wire. Also, the cellulose fibers may be comprised in a wet pulp or a pulp slurry and the PLA fibers may be coated with a coating as defined hereinabove or hereinafter. Optionally in step iv) and v), the dewatering and drying may be performed using a paper wire. Additionally, steps i) to v) may be performed according to steps a) to f) as disclosed above.

A bale comprising cellulose fibers may be converted to a pulp slurry by adding water to the composition until a concentration of 4 weight % fibers has been obtained. The slurry may be refined by a refiner, such as a cone refiner, the specific energy input may be of from 60 to 300 kWh/ton, such as from 90 to 200 kWh/ton, such as 100 kWh/ton and the specific edge load may be 2-50 J/m. After the refining, the pulp slurry may be mixed with a PLA fiber suspension. Water may be added to the composition comprising PLA fibers and cellulose fibers until a concentration of 2 weight % fiber has been obtained. Additional additives may be added. The composition comprising PLA fibers and cellulose fibers may optionally be refined one more time before the forming. The forming may be performed by using a plane wire. The composition may be dewatered. After the forming, the composition may be transferred to a press fabric and the pressing of the paper sheet may be performed by using e.g. two press rolls or a shoe press wherein the solids content may be increased of from 20 to 50%. After the pressing, the paper sheet may be transferred to a drying wire and the dewatering may be performed by using heated drying cylinders having a temperature from 120 to 150° C.

The paper sheet obtained by the method for manufacturing a paper sheet as defined hereinabove or hereinafter may have an air permeability of from 30 to 1400 μm/Pas and a fold of from 2.0 to 3.3 and a tear index of from 24-40 mNm²/g and a formation of from 4.9 to 10.

In still a further aspect of the invention there is provided a process for manufacturing a composition comprising cellulose fibers and thermoplastic fibers as defined hereinabove or hereinafter comprising the steps of:
 a) providing a suspension comprising non-refined thermoplastic fibers; said suspension may have a concentration of from 2 to 5 weight %, such as from 3 to 4 weight %, such as 3.5 weight %;
 b) providing a pulp slurry comprising the cellulose fibers; said pulp slurry may have a concentration from 2 to 5 weight %, such as from 3 to 4 weight %, such as 3.5 weight %;
 c) refining the pulp slurry comprising the cellulose fibers;
 d) mixing the refined pulp slurry from step c) with the suspension comprising the non-refined thermoplastic fibers from step a);
 e) dewatering the composition obtained from step d); and
 f) drying the composition obtained from e).

Additionally, said process may also comprise the step of forming the composition into a sheet or a bale, which step may be performed after step e) or after step f). Further, the thermoplastic fibers may be coated with a coating as defined hereinabove or hereinafter and the thermoplastic fibers may be PLA fibers.

Hence, the present process as disclosed hereinabove or hereinafter will provide compositions which, when converted into slurries comprising thermoplastic fibers and cellulose fibers, will provide less flocks and thereby better properties in said slurries and in products obtained from said composition or said slurries.

Additives such as organic or inorganic pigments, binders, retention agents, flocking agents, adhesives and/or fixing agents may be added to the composite material described herein.

In still a further aspect of the invention there is provided a composition comprising cellulose fibers and polylactide fibers (PLA), wherein said polylactide fibers are coated with a coating comprising a non-ionic polymer and/or an anionic polymer and/or a cationic polymer and/or a lubricant.

The composition comprising cellulose fibers and polylactide fibers according to the composition of the further aspect described above, wherein said coating comprises a non-ionic polymer and/or an anionic polymer and/or a lubricant.

The composition comprising cellulose fibers and polylactide fibers according to the composition of the further aspect described above, wherein said coating comprises a non-ionic polymer and an anionic polymer and a lubricant.

The composition comprising cellulose fibers and polylactide fibers according to the composition of any one of the further aspects above, wherein the polylactide fibers have a length of from 2 to 6 mm.

The composition comprising cellulose fibers and polylactide fibers according to the composition of any one of the further aspects above, wherein the cellulose fibers have a length from 0.5 to 4 mm.

The composition comprising cellulose fibers and polylactide fibers according to the composition of any one of the further aspects above, wherein said non-ionic polymer is a non-ionic tenside, said anionic polymer is an anionic tenside and said lubricant is a wax.

The composition comprising cellulose fibers and polylactide fibers according to the composition of any one of the further aspects above, wherein the polylactide fibers have a crimp angle which is 98° or more.

It will be appreciated that the invention is not limited by the embodiments described above, and further modifications of the invention within the scope of the claims would be apparent to a skilled person.

The present invention is further illustrated by the following non-limiting examples.

EXAMPLES

Abbreviations:
kg kilogram
$m^3$ cubic meter
OG blending number
rpm revolutions per minute
$H_2SO_4$ sulfuric acid
kWh kilowatt hour
mm millimeter
J/m joule/meter
VPD dewatering press
LDPE low-density polyethylene
LLDPE linear low-density polyethylene
MDPE medium-density polyethylene
HDPE high-density polyethylene
TEA tensile energy adsorption
TSI tensile stiffness index
Nm/g Newton meter per gram
$mNm^2/g$ milli Newton square meter per gram
μm/Pas micro meter per Pascal second
kPa kilopascal
kJ/kg kilo Joule per kilogram
MNm/kg mega Newton meter per kilogram
Log 10 decimal logarithm
dtex linear mass density of a textile fibre, which is defined as the mass in grams per 10 000 meters
CTMP Chemi-Thermo-Pechanical Pulp
TMP thermomechanical pulp
Rh relative humidity
RH relative humidity

Example 1

Manufacturing of a Composition

PLA Fiber Suspension

PLA fibers denominated Trevira D260 were purchased from Trevira GmbH, Hattersheim, Germany Dry PLA fibers were suspended in a suspension vessel with a volume of 30 $m^3$. Water having a temperature of 50° C. was added to the vessel and then about 660 to 1200 kg coated PLA fibers were added. Additional water having a temperature of 60° C. was added until the suspension had a concentration of 3.5 weight % coated PLA fibers.

The mixing was performed by an impeller having a number of revolutions of 43±3 rpm, which corresponds to OG number 11 according to the STAMO's calculation model. STAMO is a mixing factor used for describing the effect of the mixer and it is calculated using Re number (i.e. Reynold number), the size, form and speed of the mixer. In this example, is Re about 3 millions. OG is a measure on the turbulence and this number depends on the angle of the baffle blades, rotation speed (rpm), the size of the vessel, size of the impeller, properties of the suspension.

After mixing until the slurry was homogeneously dispersed during approximately 15 minutes, the PLA slurry was pumped to a 60 $m^3$ storage tank, wherein the mixing was performed by using four impellers installed on a vertical axis spinning 43±3 rpm, which corresponds to OG number 12.4 according to the STAMO's calculation model. The PLA slurry was kept in the storage tank for a short time, up to 1 hour.

Cellulosic Fiber Suspension

Cellulosic fibers in the form of a pulp slurry were added to a vessel and water was added until the concentration of the suspension was 3.5±2%. The pH was adjusted from pH 8 to pH 4.8 with diluted $H_2SO_4$. The pulp slurry was pumped from the vessel to a wear sieve wherein accepted pulp was passed a 0.18 mm wear cage. The screened pulp slurry was then transferred to a cone refiner, wherein the pulp was refined up to 100 kWh/ton with a refining equipment equipped with 4 mm bar, 5 mm groove width, cutting length 4.62 mm and a bar angle of 60°. Specific edge load was 4.3 J/m at 600 rpm. The refining temperature was 60-90° C. After the refining, the obtained pulp slurry was stored in a compensation vessel before it was mixed with the PLA slurry.

Manufacture of the Composition

The PLA fiber slurry was transported in a pipe and added to the cellulosic pulp slurry prior to the mixing pump. From here the obtained composition was pumped to the VPD dewatering press. The composition comprised 30±3% PLA fibers.

Dewatering:

A VPD press was used for dewatering the pulp/PLA fiber composition via the charging vessel on the underside and the dewatering was performed in the pinch between two rotating rolls. The rolls were hollow and functioned as mechanical filters wherein the water passed inside the roll while a fiber cake was left on the surface of the roll. The obtained fiber cake was scraped off the roll and transported to the wet fan and blown into the flake dryer.

The dry content of the flakes was about 55±5%.

Drying:

The drying was performed in several steps by using a flash dryer and hot air (150° C.). The dry content of the composition after the drying was about 88.5±1%.

Compressing:

After the drying had been performed, the composition was transferred as a fluidized composition to a baling press. The temperature was 30±3° C. The weight of the obtained composition was determined and depended on how many layers of pressed composition were used and the rotation of the auger feeder.

Example 2

Manufacture of a Paper Sheet

Never-dried softwood kraft pulp was washed and refined in a Voith LR40 disk refiner at a concentration of 4 weight %. Specific refining energy was ranged from 0 to 150 kWh/ton and specific edge load was 2 J/m. After refining, the pulp slurry was mixed with an aqueous suspension of PLA fibers having a PLA content from 0 to 50 weight % (0 means that the slurry comprised cellulosic fibers only and this sample was used as reference sample) and dried at 90° C. and 50% RH until a 90% solid content was obtained. After drying, small flake bales were made by compressing the dry composition comprising cellulosic fibers and coated PLA fibers into a steel mold (10×20 cm) having in the 14-ton press and the latter with 35-ton press.

The bale was dissolved in water and refined again in a Voith LR40 disk refiner at a concentration of 4 weight %. Prior to the refining, the pulp was disintegrated by circulating for 10 minutes with no load. The refining was adjusted to a specific refining energy of from 0 to 200 kWh/ton and the specific edge load was 2 J/m.

All paper sheets (pulp mill and paper mill refined) were made in a Finnish sheet former according to ISO 5269-1. Before the paper sheets were produced, the composite article comprising the cellulosic fibers and coated PLA fibers was disintegrated in a pulper at 30 000 rpm at a concentration of 3%. After pulping, the composition was diluted and the appropriate amount was added to the sheet form, wherein wet sheets (16.5×16.5 cm) having a basis weight of 100 g/m² were produced. The wet sheets were covered and removed from the paper wire. After the forming, the wet sheets were pressed in two rounds of 400 kPa (5.2 and 2.2 minutes) between blotters that were exchanged to dry blotters between pressings. The solids content of wet paper sheet after pressing varied and was from 50 to 60 weight %. These paper sheets were dried for at least 3 days in a conditioned room at 23° C. and 50% RH.

Dry paper sheets were used for physical testing.

Physical testing was conducted according to standard procedures for paper testing. The thickness was determined according to the standard EN20534. Measurements were carried out with a precision micrometer with a static pressure of 100 kPa and on a surface of 200 mm². With these data and the sample weight and surface density was calculated, and the paper grammage. Tear strength was made with Lorentzen & Wettre tester in accordance with standard method EN 21 974 which used samples 62×40 mm. Tensile strength (tensile index, TSI, TEA, stretch) in accordance with ISO 1924-3, within 15 mm paper strips were analyzed by strain rate 100 mm/min and the distance between the clamps was 100 mm. The wet strength measurements were made according to EN 12625-5 with 10 strips and a Roel Zwick tensile tester. Soaking the samples was performed during 15 sec, elongation was 50 mm/min and the distance between the clamp and the rod was 50 mm. The air permeability was determined in accordance with ISO 5636-5 (Gurly). Water retention value WRV, was measured according to SCAN-C 62:00, wherein 2 g of bone dry pulp were centrifuged for 10 minutes in 10 000 rpm. Z-strength was analyzed according to SCAN P90. Folding strength and folding endurance (Köhler-Molin) were analyzed according to ISO 5626:1993 and beta formation according to the FA 11 701.

The invention claimed is:

1. A process for manufacturing a composition comprising cellulose pulp fibers and thermoplastic fibers wherein said process comprises the step of:
    a) mixing a refined pulp suspension with a water suspension of non-refined thermoplastic fibers.

2. A process according to claim 1, wherein the pulp suspension has a concentration from 0.1 weight % to 4 weight %.

3. A process according to claim 1, wherein the pulp of the pulp suspension is wood pulp.

4. A process according to claim 1, wherein the pulp of the pulp suspension is never-dried wood pulp.

5. A process according to claim 4, wherein the never-dried wood pulp is never-dried softwood pulp or never-dried softwood kraft pulp.

6. A process according to claim 1, wherein the water suspension of thermoplastic fibers has concentration from 2 to 5 weight %.

7. A process according to claim 1, wherein the thermoplastic fibers are fibers of a thermoplastic selected from the group consisting of a polyolefin, a polyester, a polycarbonate, a polyvinyl and a copolymer or mixture thereof.

8. A process according to claim 7, wherein the polyolefin is selected from polyethylene and polypropylene.

9. A process according to claim 7, wherein the polyester is selected from polyhydroxybutyrat (PHB) and polylactic acid (PLA).

10. A process according to claim 1, wherein the thermoplastic fibers are PLA fibers.

11. A process according to claim 1, wherein said process further comprises the steps of:
    b) dewatering the composition into a composite article, and
    c) drying the composite article.

12. A composition made by the process of claim 1.

13. A composite article produced by the process according to claim 11.

14. A composite article according to claim 13, wherein the composite article is present in a container, a food container, specialty paper, tissue paper, a tea bag, a label, furniture, security paper, banknote paper, a fiber board, a paper board, fabric, a laminate, or a billboard.

* * * * *